(12) United States Patent
Gordon et al.

(10) Patent No.: US 12,473,839 B1
(45) Date of Patent: Nov. 18, 2025

(54) MODULAR ELECTRICITY GENERATOR

(71) Applicant: OneSubsea IP UK Limited, London (GB)

(72) Inventors: Alexandre James Gordon, Lysaker (NO); Pierre Petit, Houston, TX (US); Robert Large, Houston, TX (US)

(73) Assignee: OneSubsea IP UK Limited, London (GB)

( * ) Notice: Subject to any disclaimer, the term of this patent is extended or adjusted under 35 U.S.C. 154(b) by 0 days.

(21) Appl. No.: 18/885,247

(22) Filed: Sep. 13, 2024

(51) Int. Cl.
*F01D 15/10* (2006.01)
*F01K 7/16* (2006.01)
*F01K 25/10* (2006.01)

(52) U.S. Cl.
CPC .............. *F01D 15/10* (2013.01); *F01K 7/16* (2013.01); *F01K 25/106* (2013.01); *F05D 2210/12* (2013.01); *F05D 2220/62* (2013.01)

(58) Field of Classification Search
CPC .......... F01K 23/10; F01K 7/16; F01K 25/106; F05D 2220/62
See application file for complete search history.

(56) References Cited

U.S. PATENT DOCUMENTS 11,732,644 B2 * 8/2023 Deng ..................... F02C 3/22
    60/39.12
12,180,861 B1 * 12/2024 Bodishbaugh .......... F01K 25/06

\* cited by examiner

*Primary Examiner* — Abiy Teka
(74) *Attorney, Agent, or Firm* — Jeffrey D. Frantz

(57) ABSTRACT

A device may receive heat from a production fluid with a source heat exchanger. A device may transfer the heat to a working fluid with the source heat exchanger. A device may expand the working fluid in a turbine. A device may generate electricity with the turbine. A device may exhaust heat from the working fluid to an ambient liquid with a sink heat exchanger. A device may compress the working fluid after the sink heat exchanger and before the source heat exchanger.

20 Claims, 5 Drawing Sheets

MODULAR ELECTRICITY GENERATOR

BACKGROUND OF THE DISCLOSURE

Hydrocarbon fluids such as oil and natural gas can be obtained from subterranean geologic formations, referred to as a reservoir, by drilling a wellbore. For subsea applications, wellbores are formed through a subsea wellhead system that penetrates the hydrocarbon-bearing geologic formation. Once a wellbore is drilled, various forms of well completion components may be installed to control and enhance the efficiency of producing the various fluids from the reservoir. Downhole and/or subsea components often require electrical power to operate. Providing electrical power to such locations can be challenging.

SUMMARY

In some aspects, the techniques described herein relate to a method of producing electricity, the method including: receiving heat from a production fluid with a source heat exchanger; transferring the heat to a working fluid with the source heat exchanger; expanding the working fluid in a turbine; generating electricity with the turbine; exhausting heat from the working fluid to an ambient liquid with a sink heat exchanger; and compressing the working fluid after the sink heat exchanger and before the source heat exchanger.

In some aspects, the techniques described herein relate to a system for producing electricity, the system including: a working fluid conduit configured to flow a working fluid therethrough; a source heat exchanger in thermal communication with the working fluid conduit and configured to transfer heat from a production fluid to the working fluid conduit; a sink heat exchanger in thermal communication with the working fluid conduit and configured to exhaust heat from the working fluid conduit to an ambient liquid; and a turbine in fluid communication with the working fluid conduit and configured to generate electricity from a flow of working fluid therethrough.

In some aspects, the techniques described herein relate to a method of producing electricity, the method including: receiving heat from a production fluid with a source heat exchanger; transferring the heat to a working fluid with the source heat exchanger; vaporizing the working fluid to a gas phase; superheating the gas phase; flowing the gas phase through a turbine; generating electricity based on a rotation of the turbine; exhausting heat from the gas phase to a seawater with a sink heat exchanger; and condensing the gas phase to a liquid phase after the sink heat exchanger and before the source heat exchanger.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
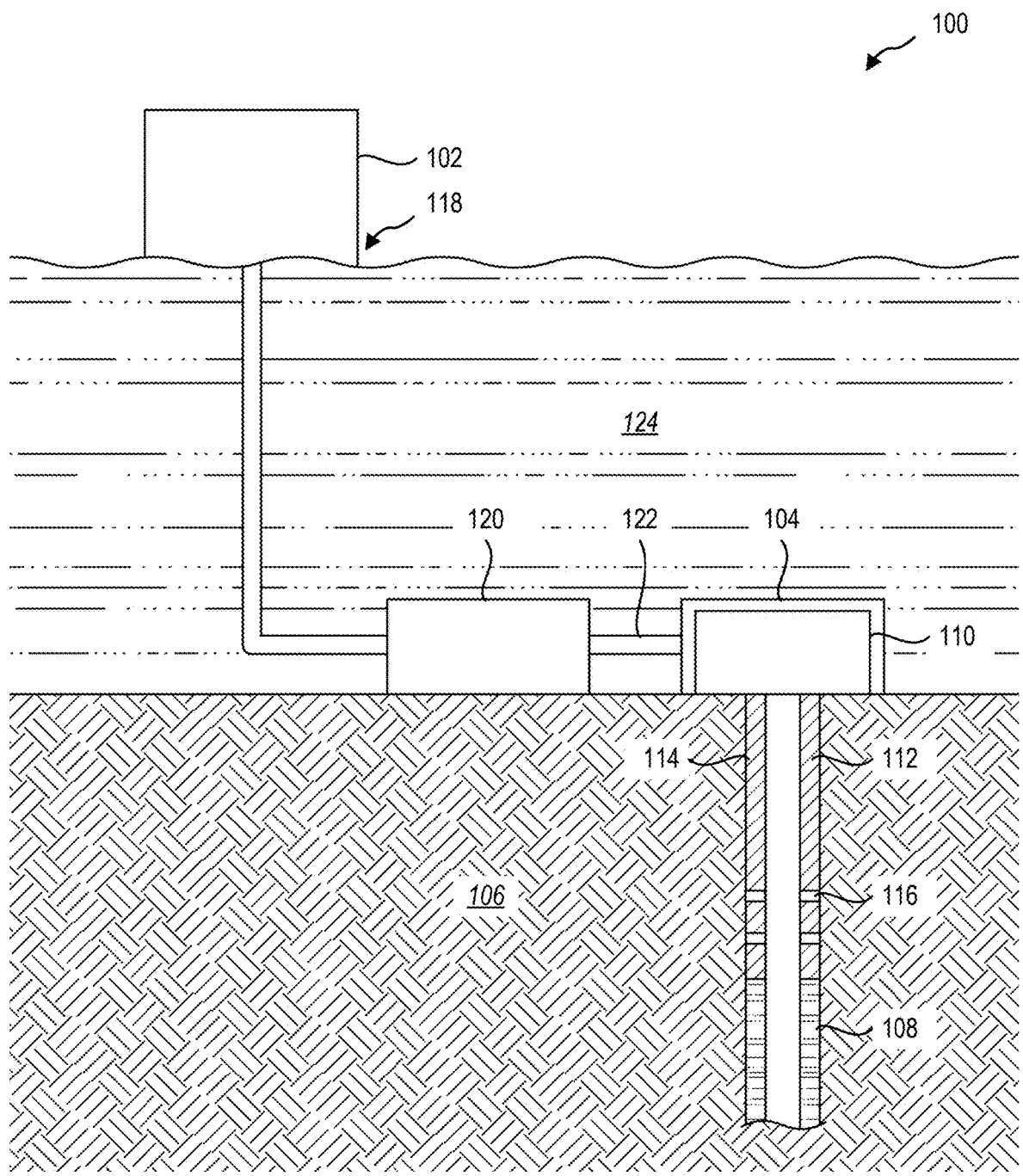
FIG. 1 is an example of a subsea system, according to at least one embodiment of the present disclosure.

The present disclosure relates generally to providing electrical power in a subsea environment. More particularly, the present disclosure relates to providing electrical power locally in a subsea environment. In at least some examples, the present disclosure describes modular power generation and power generators configured to generate electrical power based on a thermodynamic cycle of a working fluid. In some embodiments, the working fluid changes phase during the thermodynamic cycle, such as vaporizing into a gas phase and condensing into a liquid phase. In some embodiments, the working fluid expands and contracts while remaining in a single phase, such as by temperature at least partially according to an ideal gas law. In some embodiments, the working fluid receives heat from a production fluid and exhausts heat to an ambient liquid.

In some embodiments, the electrical generator creates electricity based on a Brayton cycle. In some embodiments, the electrical generator creates electricity based on a Stirling cycle. In some embodiments, the electrical generator creates electricity based on a Kalina cycle. In some embodiments, the electrical generator creates electricity based on a Rankine cycle. In some embodiments, the electrical generator generates electricity based on an expansion of a working fluid through a turbine, a piston-and-cylinder, or another device to convert the mechanical force of the working fluid expansion to electrical power.

In some embodiments, the electrical power is provided to another device local to the thermodynamic cycle generator in the subsea environment. In some embodiments, the electrical power is provided to a downhole location in a wellbore connected to the subsea environment. In some embodiments, the electrical power is provided to a surface location at a platform or surface vessel. In some embodiments, the electrical power is provided to a downhole location in a wellbore connected to the subsea environment. In some embodiments, the electrical power is provided to a computing device, such as a control device. In some embodiments, the electrical power is provided to a motor, such as a pump or a valve actuator. In some embodiments, the electrical power is provided to a battery or other electrical storage device. In at least one embodiment, the electrical power is provided to a battery local to and/or integrated with the thermodynamic generator.

Thermal cycle generators, according to some embodiments of the present disclosure, may allow for modular electrical power generation in a subsea environment. For example, a thermal cycle generator may be used while expanding an existing brown field site where the expansion requires additional power beyond the original design or plan of the site. In some examples, the thermal cycle generator may provide on-location power generation in a subsea environment without requiring connection to a platform or surface vessel. In some examples, the thermal cycle generator may be a backup or secondary power source to provide redundancy in the event of a failure or shutdown of a primary power source.

Additional details will now be provided regarding systems described herein in relation to illustrative figures portraying example embodiments. FIG. 1 is an embodiment of a system 100, according to at least one embodiment of the present disclosure. The system 100 may be configured to extract various materials, such as oil, gas and/or hydrocarbons from the earth. In the illustrated embodiment, the system 100 is subsea (e.g., a subsea system, an offshore system, etc.). In certain embodiments, the system 100 may be land-based (e.g., a surface system). The system 100 may include a surface vessel or platform 102, such as a rig, generally located at a first surface (e.g., a sea surface or a land surface).

The system 100 may include a wellhead assembly 104 (e.g., a wellhead system, a subsea wellhead assembly) located below the first surface. In some embodiments, the wellhead assembly 104 may be located near the first surface (e.g., less than 500 meters (m) below the first surface). In some embodiments, the wellhead assembly 104 may be located at greater than or equal to approximately 500 m, 1,000 m, 2,000 m, 3,000 m, or more below the first surface. The wellhead assembly 104 couples to a wellbore 108 to enable extraction of minerals from a subterranean formation 106 (e.g., a reservoir, a mineral deposit, etc.) disposed below a second surface (e.g., a sea floor, a mudline, etc.) of the earth. The wellhead assembly 104 may include a wellhead 110 (e.g., wellhead housing), which may be generally located at or near the second surface.

The wellhead assembly 104 may include a plurality of coaxial strings 112 (e.g., pipes, casing, and/or tubing) that extend from the wellhead 110 into the wellbore 108. The strings 112 may be cemented into place in the wellbore 108. In particular, cement or other casing 114 may be disposed between the strings 112 and the subterranean formation 106, for example, to block or prevent unintentional flow of fluids (e.g., oil, gas, and/or hydrocarbons) from the subterranean formation 106 to the surface or to other subterranean formations below the surface. In some embodiments, the cement or other casing 114 may extend into an annulus or annuli formed between the strings 112. Further, the wellhead assembly 104 may include a plurality of perforations 116 (e.g., holes) that extend through the casing 114 and at least one string 112 of the plurality of strings (e.g., casing strings) to establish fluid communication between the subterranean formation 106 and the wellhead assembly 104.

The wellhead assembly 104 may include multiple components that control and regulate activities and conditions associated with the well or wellbore 108. For example, the wellhead assembly 104 may include components such as bodies, valves, seals, a tree (e.g., a Christmas tree), and so forth, that route minerals extracted from the subterranean formation 106, regulate pressure in the well or wellbore 108, and/or inject chemicals into the well or wellbore 108.

The system 100 may include a control system 118 (e.g., a surface controller, a topside controller, a processor-based controller, a subsea control module, a master control module, etc.) for providing communication (e.g., electrical or optical) and/or power transmission to various subsurface components. The control system 118 may be generally located at the first surface but may be located and/or may include components located at any other location. In some embodiments, the control system 118 may be disposed on the surface vessel or platform 102. The control system may communicate with (e.g., data communication, power transmission, monitoring, controlling, etc.) various subsurface components for enhancing the efficiency and safety of producing minerals from the subterranean formation 106. For instance, the control system 118 may communicate with subsea valves and instruments, and/or permanently installed downhole sensors, gauges, and other instrumentation. In some examples, the control system 118 may power subsea or downhole valves or other equipment.

The control system 118 may be connected to these downhole components via a connector such as a subsea wellhead wet-mate feedthrough connector or a feedthrough connection assembly. In some embodiments, the connector may be positioned at and may penetrate the wellhead 110, however, the connector may be positioned at any other location, such as in the wellbore 108. In addition to facilitating communication of the control system 118, the connector may provide pressure containment of the wellbore 108 through the wellhead assembly 104 (e.g., wellhead 110, Christmas tree, etc.).

In some examples, the downhole system 100 includes a pipeline end termination (PLET) 120 or pipeline end manifold (PLEM) that allows the platform 102, surface vessel, or other structure at the first surface to connect to the wellhead 110, the production pipe, or otherwise receive production fluid from the wellbore 108. In some embodiments, the production fluid conduit 122 conveys production fluid away from the wellhead assembly 104 through at least a portion of the surrounding ambient liquid 124, such as seawater or freshwater. In some embodiments, the production fluid conduit 122 connects the wellhead 110 to the PLET 120. In some embodiments, the production fluid conduit 122 connects the PLET 120 to the platform 102, surface vessel, or other structure at the first surface.

Figure 2:
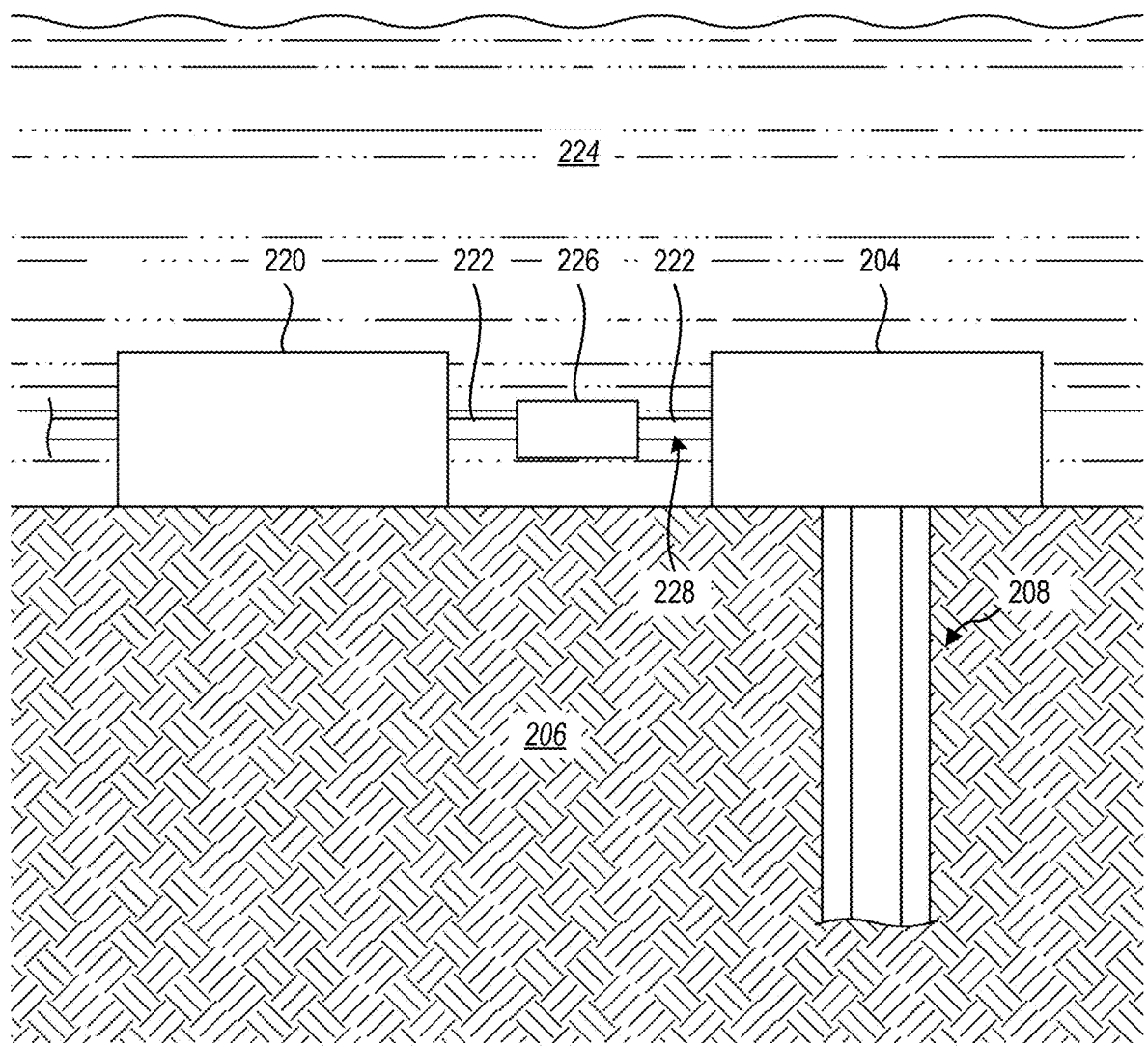
FIG. 2 is a detail view of a subsea environment, according to at least one embodiment of the present disclosure.

FIG. 2 is a schematic representation of a subsea environment including a thermal cycle generator 226 according to at least some embodiments of the present disclosure. In some embodiments, the thermal cycle generator 226 is positioned on or in the production fluid conduit 222 such that a production fluid 228 flows through at least a portion of a longitudinal length of the thermal cycle generator 226. For example, the thermal cycle generator 226 may be coupled between segments of the production fluid pipe that conveys the production fluid 228 therethrough, and the production fluid 228 flows through the thermal cycle generator 226 to transfer heat to the thermal cycle generator 226. In some examples, the thermal cycle generator 226 is positioned on or around a production fluid pipe and configured to receive heat from the production fluid 228 through the production fluid pipe.

In some embodiments, the thermal cycle generator 226 is positioned after the wellhead assembly 204 in the flow direction of the production fluid 228. In some embodiments, the thermal cycle generator 226 is positioned before a PLET 220 or PLEM in the flow direction of the production fluid 228. In some embodiments, the thermal cycle generator 226 is positioned between the wellhead assembly 204 and the PLET 220 or PLEM in the flow direction of the production fluid 228. In some embodiments, the thermal cycle generator 226 is positioned after the PLET 220 or PLEM in the flow direction of the production fluid 228, such as on a conduit to a platform or surface vessel described in relation to FIG. 1.

The thermal cycle generator 226 is configured to receive heat from the production fluid and exhaust the heat to the ambient liquid 224. For example, the ambient liquid 224 may be seawater, freshwater, or another ambient liquid in which the wellhead assembly 204 is submerged. The production fluid 228 flows substantially continuously through the thermal cycle generator 226 during production, while the ambient liquid 224 is free to flow and move around the exterior of the thermal cycle generator 226. As the production fluid 228 emerging from the wellbore 208 is at a substantially constant production temperature of the formation 206 that is greater than a substantially constant ambient temperature of the ambient liquid 224, a temperature difference is maintained across the thermal cycle generator 226. While surface temperatures can vary, much of the deep ocean (e.g., below 200 meters) has a substantially constant ambient temperature of less than 4° C.

Figure 3:
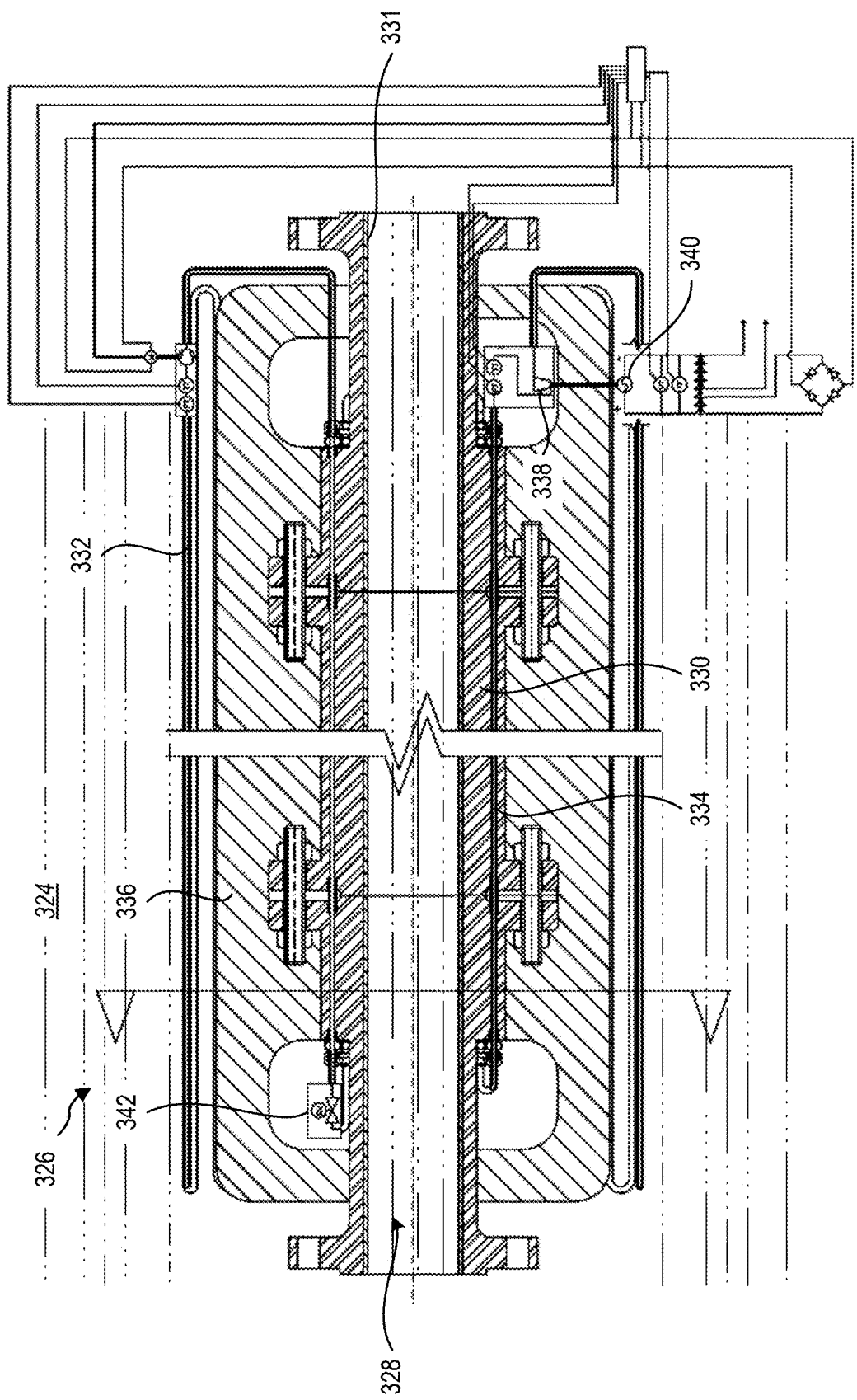
FIG. 3 is a side cross-sectional section view of a thermal cycle generator in a subsea environment, according to at least one embodiment of the present disclosure.

FIG. 3 is a longitudinal cross-sectional view of an embodiment of a thermal cycle generator 326 for use in a subsea environment, such as that described in relation to FIG. 1 and FIG. 2. In some embodiments, the thermal cycle generator 326 includes a source heat exchanger 330 configured to receive heat from the production fluid 328 at a production temperature. The source heat exchanger 330 receives the heat through a contact surface of the source heat exchanger 330. In some embodiments, the source heat exchanger 330 has a cladding 331 on the contact surface between the source heat exchanger 330 and the production fluid 328. In some embodiments, a body of the source heat exchanger 330 is in direct contact with the production fluid 328. In some embodiments, the source heat exchanger 330 includes steel or other iron alloy. In some embodiments, the source heat exchanger 330 includes aluminum or other corrosion resistant alloy. In some embodiments, the source heat exchanger 330 includes copper or other metal with a high coefficient of thermal conductivity.

The contact surface of the source heat exchanger 330 may have a longitudinal length (e.g., in the flow direction of the production fluid 328) based at least partially on the electrical power capacity of the thermal cycle generator 326. For example, thermal cycle generator 326 with a larger contact surface through which to receive heat from the production fluid 328 may have a greater electrical power capacity. A size of the thermal cycle generator 326 may be selected based on known or anticipated electrical power needs, and a thermal cycle generator 326 may be exchanged for one with a larger contact surface and/or larger electrical power capacity to provide modularity in a subsea environment.

The thermal cycle generator 326 includes a working fluid 334 that receives the heat from the source heat exchanger 330 and exhausts the heat at a sink heat exchanger 332. In some embodiments, the heat exchanger(s) is corrosion resistant for use in saltwater or other corrosive ambient liquid 324. In some embodiments, the heat exchanger(s) is or includes a corrosion resistant alloy (CRA). In some embodiments, the heat exchanger(s) is or includes aluminum or aluminum alloy. In some embodiments, the heat exchanger(s) is or includes a corrosion resistant layer or coating. For example, the corrosion resistant layer or coating may be a deposited (e.g., electro-plating, physical vapor deposition, chemical vapor deposition) coating. In some examples, the corrosion resistant layer or coating may be a painted layer or coating.

In some embodiments, the working fluid 334 is or includes ammonia. In some embodiments, the working fluid 334 is or includes carbon dioxide. In some embodiments, the working fluid 334 is a multi-phase working fluid that vaporizes and condenses through a cycle in the thermal cycle generator 326. In some embodiments, the working fluid 334 is a single-phase working fluid that remains a single phase (e.g., gas) throughout a cycle in the thermal cycle generator 326.

The thermal cycle generator 326 converts expansion and contraction of the working fluid 334 to electrical power by maintaining a temperature difference between the source heat exchanger 330 and the sink heat exchanger 332. In some embodiments, the thermal cycle generator 326 includes an insulation layer 336 between the source heat exchanger 330 and the sink heat exchanger 332 to limit thermal transfer between the source heat exchanger 330 and the sink heat exchanger 332 other than via the working fluid 334.

In some embodiments, the working fluid 334 receives heat from production fluid 328 via the source heat exchanger 330 and expands. The expansion of the working fluid 334 applies a force to a turbine 338, piston, or other conversion device that converts the force to electrical energy at a generator device 340. For example, the turbine 338, piston, or other conversion device may convert a linear force to a rotational movement, and the generator device 340 may generate electrical power by the rotation of a rotor relative to a stator. In some embodiments, the thermal cycle generator 326 further includes an expansion valve 342 configured to control a pressure thereacross. For example, the expansion valve 342 may selectively allow flow of the working fluid between the source heat exchanger 330 and sink heat exchanger 332. In some examples, the expansion valve 342 may selectively allow flow of the working fluid through the turbine 338 or other conversion devices.

Figure 4:
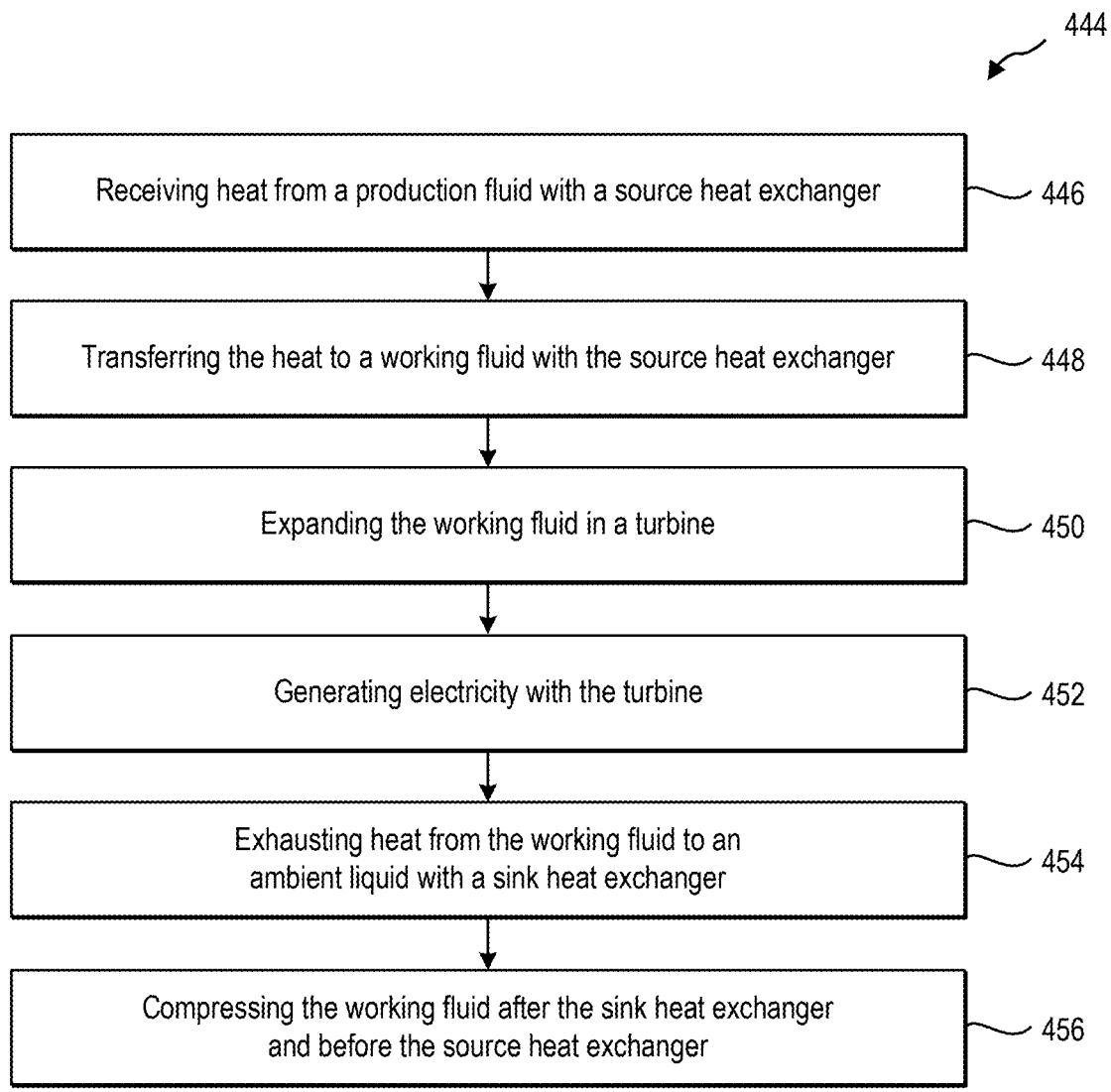
FIG. 4 is a flowchart illustrating a method of operating a thermal cycle generator in a subsea environment.

FIG. 4 is a flowchart illustrating an embodiment of a method 444 of operation of a thermal cycle generator. In some embodiments, the method 444 is performed in a subsea environment. In some embodiments, the method 444 includes receiving heat from a production fluid with a source heat exchanger at 446. As described herein, receiving heat from the production fluid may include receiving the heat through a cladding between the source heat exchanger and the production fluid. In some examples, receiving the heat through the production fluid may include receiving the heat through a production fluid pipe between the source heat exchanger and the production fluid.

The method 444 further includes transferring the heat to a working fluid with the source heat exchanger at 448. For example, the working fluid may flow through a working fluid channel integrated into, or working fluid conduit in contact with the source heat exchanger. In some embodiments, transferring the heat to a working fluid with the source heat exchanger includes heating the working fluid to a boiling temperature of the working fluid. In some embodiments, transferring the heat to a working fluid with the source heat exchanger includes vaporizing at least a portion of the working fluid. In some embodiments, transferring the heat to a working fluid with the source heat exchanger includes increasing a temperature of the working fluid.

In some embodiments, the working fluid is ammonia. In some embodiments, the working fluid is carbon dioxide. In some embodiments, the working fluid vaporizes from a liquid phase to a gas phase. In some embodiments, the working fluid increases in temperature and remains a gas while expanding.

Upon transferring heat to the working fluid, the method 444 includes expanding the working fluid in a turbine at 450. In some embodiments, the working fluid is expanded across the turbine. In some embodiments, the working fluid is expanded prior to the turbine. In some embodiments, the working fluid is expanded after the turbine. It should be understood that while the described embodiment includes a turbine, other conversion devices may be used, such as a piston-and-cylinder to convert the force of the expanding working fluid into a mechanical force or torque. In some embodiments, that mechanical force or torque drives a generator device that generates electricity with the turbine (or other conversion device) at 452. In some embodiments, a mass flow through the turbine or other conversion device is no more than 50 grams per second (gps). In some embodiments, a mass flow through the turbine or other conversion device is no more than 40 gps. In some embodiments, a mass flow through the turbine or other conversion device is no more than 35 gps. In some embodiments, the method further includes superheating a gas phase of the working fluid prior to the turbine. For example, the working fluid may expand upon vaporization, and the working fluid may further expand upon further heating after vaporization. In some embodiments, the gas is superheated after vaporization to increase a pressure of the gas phase entering the turbine, generating a greater force on the turbine.

In some embodiments, the method 444 further includes exhausting the heat from the working fluid to an ambient liquid with a sink heat exchanger at 454. Exhausting the heat may include transferring the heat to seawater. In some examples, exhausting the heat includes transferring the heat to freshwater. In some embodiments, the temperature difference between the production temperature and the ambient temperature is no more than 121° C. In some embodiments, the production temperature and the ambient temperature define a temperature difference of at least 121° C. In some embodiments, the production temperature and the ambient temperature define a temperature difference of at least 100° C. In some embodiments, the production temperature and the ambient temperature define a temperature difference of at least 50° C. In some embodiments, the source heat exchanger and the sink heat exchanger define a temperature difference of at least 121° C. In some embodiments, the source heat exchanger and the sink heat exchanger define a temperature difference of at least 100° C. In some embodiments, the source heat exchanger and the sink heat exchanger define a temperature difference of at least 50° C.

In some embodiments, the method 444 includes compressing the working fluid after the sink heat exchanger and before the source heat exchanger at 456. In some examples, compressing the working fluid includes condensing the working fluid from a gas phase to a liquid phase. In some examples, compressing the working fluid includes decreasing a temperature of the working fluid in a gas phase.

Figure 5:
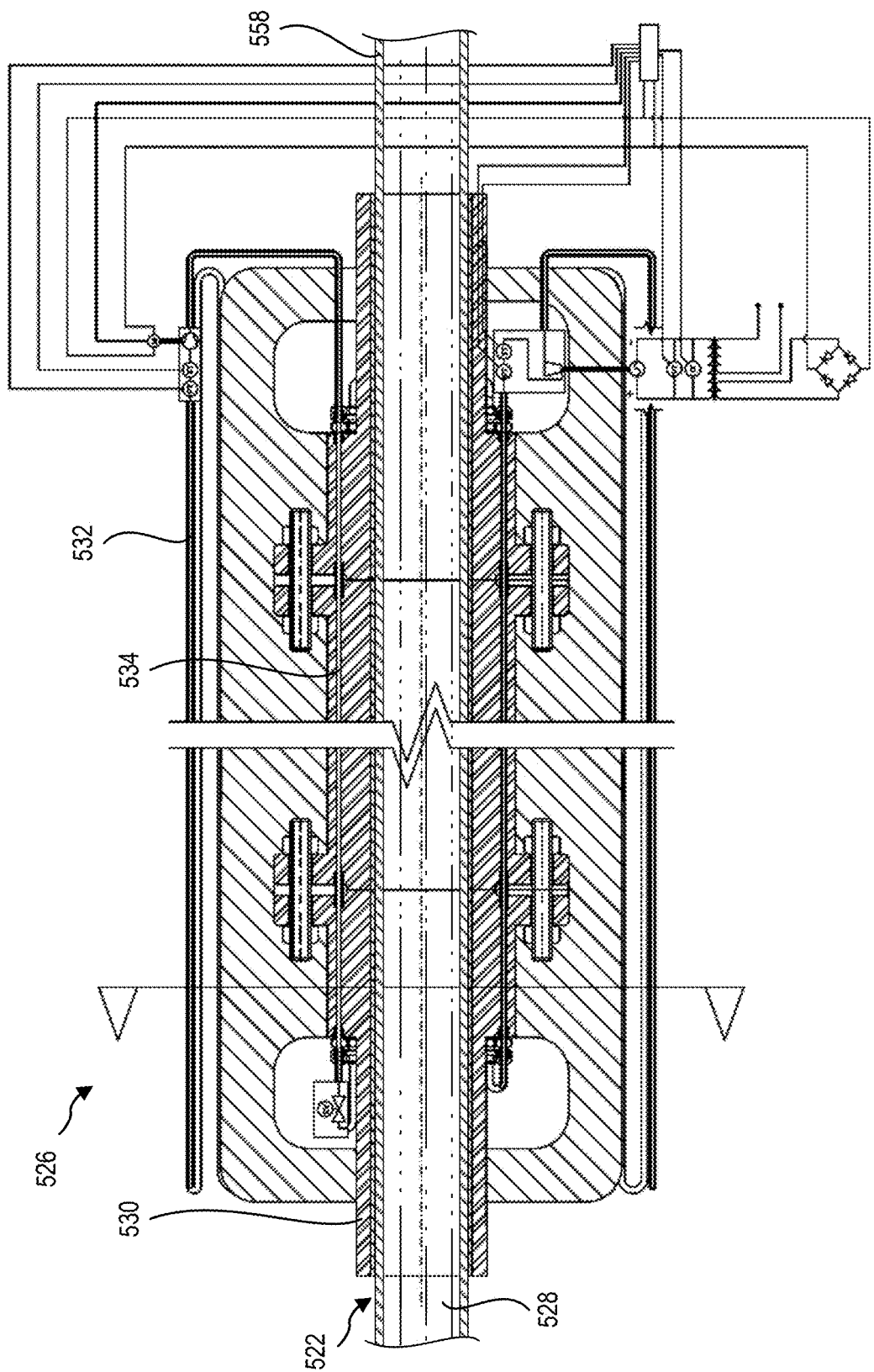
FIG. 5 is a side cross-sectional section view of a thermal cycle generator in a subsea environment, according to at least one embodiment of the present disclosure.

In some examples, the thermal cycle generator may receive the production fluid through a bore within the thermal cycle generator and flow the production fluid through the thermal cycle generator between a first segment of production fluid pipe and a second segment of production fluid pipe coupled to the longitudinal ends of the thermal cycle generator (such as described in relation to FIG. 3). As described herein, the thermal cycle generator may be positioned around a portion of a production fluid pipe and receive heat from the production fluid through the segment of the production fluid pipe. FIG. 5 is a longitudinal cross-sectional view of an embodiment of a thermal cycle generator positioned around a segment of production fluid pipe.

In some embodiments, the thermal cycle generator 526 includes a source heat exchanger 530 configured to receive heat from the production fluid 528 at a production temperature. The source heat exchanger 530 receives the heat through a contact surface of the source heat exchanger 530. In some embodiments, the contact surface of the source heat exchanger 530 directly contacts a segment 558 of the production fluid conduit 522 through which the production fluid 528 flows. In some embodiments, a body of the source heat exchanger 530 is in direct contact with the production fluid 528. In some embodiments, the source heat exchanger 530 includes steel or other iron alloy. In some embodiments, the source heat exchanger 530 includes aluminum or other corrosion resistant alloy. In some embodiments, the source heat exchanger 530 includes copper or other metal with a high coefficient of thermal conductivity.

The contact surface of the source heat exchanger 530 may have a longitudinal length (e.g., in the flow direction of the production fluid 528) based at least partially on the electrical power capacity of the thermal cycle generator 526. For example, thermal cycle generator 526 with a larger contact surface through which to receive heat from the production fluid 528 may have a greater electrical power capacity. A size of the thermal cycle generator 526 may be selected based on known or anticipated electrical power needs, and a thermal cycle generator 526 may be exchanged for one with a larger contact surface and/or larger electrical power capacity to provide modularity in a subsea environment.

The thermal cycle generator 526 includes a working fluid 534 that receives the heat from the source heat exchanger 530 and exhausts the heat at a sink heat exchanger 532. In some embodiments, the heat exchanger(s) is corrosion resistant for use in saltwater or other corrosive ambient liquid. In some embodiments, the heat exchanger(s) is or includes a corrosion resistant alloy (CRA). In some embodiments, the heat exchanger(s) is or includes aluminum or aluminum alloy. In some embodiments, the heat exchanger(s) is or includes a corrosion resistant layer or coating. For example, the corrosion resistant layer or coating may be a deposited (e.g., electro-plating, physical vapor deposition, chemical vapor deposition) coating. In some examples, the corrosion resistant layer or coating may be a painted layer or coating.

In some embodiments, the working fluid 534 is or includes ammonia. In some embodiments, the working fluid 534 is or includes carbon dioxide. In some embodiments, the working fluid 534 is a multi-phase working fluid that vaporizes and condenses through a cycle in the thermal cycle generator 526. In some embodiments, the working fluid 534 is a single-phase working fluid that remains a single phase (e.g., gas) throughout a cycle in the thermal cycle generator 526.

As described herein, thermal cycle generators, according to at least some embodiments of the present disclosure, generate electrical power based on a temperature difference between a heat source and a heat sink. In some embodiments, the electrical power generated is based at least partially on a longitudinal length of the thermal cycle generator. As the longitudinal length of the thermal cycle generator increases, a longitudinal length of the contact surface of the source heat exchanger and/or a longitudinal length of the sink heat exchanger increases. The electrical power capacity of the thermal cycle generator may be based at least partially on the thermal transfer across the source heat exchanger from the production fluid and across the sink exchanger to the ambient liquid. Therefore, an increase in longitudinal length of the thermal cycle generator allows for an increase in electrical power capacity. For example, a thermal cycle generator according to embodiment of the present disclosure can generate 100 Watts (W) to 300 W from heat sources with temperatures between 55° C. and 85° C. (and 4° C. ambient liquid) using longitudinal lengths that vary from 1.5 m to 4.5 m.

INDUSTRIAL APPLICABILITY

The present disclosure relates generally to providing electrical power in a subsea environment. More particularly, the present disclosure relates to providing electrical power locally in a subsea environment. In at least some examples, the present disclosure describes modular power generation and power generators configured to generate electrical power based on a thermodynamic cycle of a working fluid. In some embodiments, the working fluid changes phase during the thermodynamic cycle, such as vaporizing into a gas phase and condensing into a liquid phase. In some embodiments, the working fluid expands and contracts while remaining in a single phase, such as by temperature at least partially according to an ideal gas law. In some embodiments, the working fluid receives heat from a production fluid and exhausts heat to an ambient liquid.

In some embodiments, the electrical generator creates electricity based on a Brayton cycle. In some embodiments, the electrical generator creates electricity based on a Stirling cycle. In some embodiments, the electrical generator creates electricity based on a Kalina cycle. In some embodiments, the electrical generator creates electricity based on a Rankine cycle. In some embodiments, the electrical generator generates electricity based on an expansion of a working fluid through a turbine, a piston-and-cylinder, or another device to convert the mechanical force of the working fluid expansion to electrical power.

In some embodiments, the electrical power is provided to another device local to the thermodynamic cycle generator in the subsea environment. In some embodiments, the electrical power is provided to a downhole location in a wellbore connected to the subsea environment. In some embodiments, the electrical power is provided to a surface location at a platform or surface vessel. In some embodiments, the electrical power is provided to a downhole location in a wellbore connected to the subsea environment. In some embodiments, the electrical power is provided to a computing device, such as a control device. In some embodiments, the electrical power is provided to a motor, such as a pump or a valve actuator. In some embodiments, the electrical power is provided to a battery or other electrical storage device. In at least one embodiment, the electrical power is provided to a battery local to and/or integrated with the thermodynamic generator.

Thermal cycle generators, according to some embodiments of the present disclosure, may allow for modular electrical power generation in a subsea environment. For example, a thermal cycle generator may be used while expanding an existing brown field site where the expansion requires additional power beyond the original design or plan of the site. In some examples, the thermal cycle generator may provide on-location power generation in a subsea environment without requiring connection to a platform or surface vessel. In some examples, the thermal cycle generator may be a backup or secondary power source to provide redundancy in the event of a failure or shutdown of a primary power source.

In some embodiments, a thermal cycle generator is positioned on or in the production fluid conduit such that a production fluid flows through at least a portion of a longitudinal length of the thermal cycle generator. For example, the thermal cycle generator may be coupled between segments of the production fluid pipe that conveys the production fluid therethrough, and the production fluid flows through the thermal cycle generator to transfer heat to the thermal cycle generator. In some examples, the thermal cycle generator is positioned on or around a production fluid pipe and configured to receive heat from the production fluid through the production fluid pipe.

In some embodiments, the thermal cycle generator is positioned after the wellhead assembly in the flow direction of the production fluid. In some embodiments, the thermal cycle generator is positioned before a PLET or PLEM in the flow direction of the production fluid. In some embodiments, the thermal cycle generator is positioned between the wellhead assembly and the PLET or PLEM in the flow direction of the production fluid. In some embodiments, the thermal cycle generator is positioned after the PLET or PLEM in the flow direction of the production fluid, such as on a conduit to a platform or surface vessel described herein.

The thermal cycle generator is configured to receive heat from the production fluid and exhaust the heat to the ambient liquid. For example, the ambient liquid may be seawater, freshwater, or another ambient liquid in which the wellhead assembly is submerged. The production fluid flows substantially continuously through the thermal cycle generator during production, while the ambient liquid is free to flow and move around the exterior of the thermal cycle generator. As the production fluid emerging from the wellbore is at a substantially constant production temperature of the formation that is greater than a substantially constant ambient temperature of the ambient liquid, a temperature difference is maintained across the thermal cycle generator. While surface temperatures can vary, much of the deep ocean (e.g., below 200 meters) has a substantially constant ambient temperature of less than 4° C.

In some embodiments, the thermal cycle generator includes a source heat exchanger configured to receive heat from the production fluid at a production temperature. The source heat exchanger receives the heat through a contact surface of the source heat exchanger. In some embodiments, the source heat exchanger has a cladding on the contact surface between the source heat exchanger and the production fluid. In some embodiments, a body of the source heat exchanger is in direct contact with the production fluid. In some embodiments, the source heat exchanger includes steel or other iron alloy. In some embodiments, the source heat exchanger includes aluminum or other corrosion resistant alloy. In some embodiments, the source heat exchanger includes copper or other metal with a high coefficient of thermal conductivity.

The contact surface of the source heat exchanger may have a longitudinal length (e.g., in the flow direction of the production fluid) based at least partially on the electrical power capacity of the thermal cycle generator. For example, a thermal cycle generator with a larger contact surface through which to receive heat from the production fluid may have a greater electrical power capacity. A size of the thermal cycle generator may be selected based on known or anticipated electrical power needs, and a thermal cycle generator may be exchanged for one with a larger contact surface and/or larger electrical power capacity to provide modularity in a subsea environment.

The thermal cycle generator includes a working fluid that receives the heat from the source heat exchanger and exhausts the heat at a sink heat exchanger. In some embodiments, the heat exchanger(s) is corrosion resistant for use in saltwater or other corrosive ambient liquid. In some embodiments, the heat exchanger(s) is or includes a corrosion resistant alloy (CRA). In some embodiments, the heat exchanger(s) is or includes aluminum or aluminum alloy. In some embodiments, the heat exchanger(s) is or includes a corrosion resistant layer or coating. For example, the corrosion resistant layer or coating may be a deposited (e.g., electro-plating, physical vapor deposition, chemical vapor deposition) coating. In some examples, the corrosion resistant layer or coating may be a painted layer or coating.

In some embodiments, the working fluid is or includes ammonia. In some embodiments, the working fluid is or includes carbon dioxide. In some embodiments, the working fluid is a multi-phase working fluid that vaporizes and condenses through a cycle in the thermal cycle generator. In some embodiments, the working fluid is a single-phase working fluid that remains a single phase (e.g., gas) throughout a cycle in the thermal cycle generator.

The thermal cycle generator converts expansion and contraction of the working fluid to electrical power by maintaining a temperature difference between the source heat exchanger and the sink heat exchanger. In some embodiments, the thermal cycle generator includes an insulation layer between the source heat exchanger and the sink heat exchanger to limit thermal transfer between the source heat exchanger and the sink heat exchanger other than via the working fluid.

In some embodiments, the working fluid receives heat from production fluid via the source heat exchanger and expands. The expansion of the working fluid applies a force to a turbine, piston, or other conversion device that converts the force to electrical energy at a generator device. For example, the turbine, piston, or other conversion device may convert a linear force to a rotational movement, and the generator device may generate electrical power by the rotation of a rotor relative to a stator. In some embodiments, the thermal cycle generator further includes an expansion valve configured to control a pressure thereacross. For example, the expansion valve may selectively allow flow of the working fluid between the source heat exchanger and sink heat exchanger. In some examples, the expansion valve may selectively allow flow of the working fluid through the turbine or other conversion devices.

In some embodiments, a method of operation of a thermal cycle generator is performed in a subsea environment. In some embodiments, the method includes receiving heat from a production fluid with a source heat exchanger. As described herein, receiving heat from the production fluid may include receiving the heat through a cladding between the source heat exchanger and the production fluid. In some examples, receiving the heat through the production fluid may include receiving the heat through a production fluid pipe between the source heat exchanger and the production fluid.

The method further includes transferring the heat to a working fluid with the source heat exchanger. For example, the working fluid may flow through a working fluid channel integrated into, or working fluid conduit in contact with the source heat exchanger. In some embodiments, transferring the heat to a working fluid with the source heat exchanger includes heating the working fluid to a boiling temperature of the working fluid. In some embodiments, transferring the heat to a working fluid with the source heat exchanger includes vaporizing at least a portion of the working fluid. In some embodiments, transferring the heat to a working fluid with the source heat exchanger includes increasing a temperature of the working fluid.

In some embodiments, the working fluid is ammonia. In some embodiments, the working fluid is carbon dioxide. In some embodiments, the working fluid vaporizes from a liquid phase to a gas phase. In some embodiments, the working fluid increases in temperature and remains a gas while expanding.

Upon transferring heat to the working fluid, the method includes expanding the working fluid in a turbine. In some embodiments, the working fluid is expanded across the turbine. In some embodiments, the working fluid is expanded prior to the turbine. In some embodiments, the working fluid is expanded after the turbine. It should be understood that while the described embodiment includes a turbine, other conversion devices may be used, such as a piston-and-cylinder to convert the force of the expanding working fluid into a mechanical force or torque. In some embodiments, that mechanical force or torque drives a generator device that generates electricity with the turbine (or other conversion device). In some embodiments, a mass flow through the turbine or other conversion device is no more than 50 grams per second (gps). In some embodiments, a mass flow through the turbine or other conversion device is no more than 40 gps. In some embodiments, a mass flow through the turbine or other conversion device is no more than 35 gps. In some embodiments, the method further includes superheating a gas phase of the working fluid prior to the turbine. For example, the working fluid may expand upon vaporization, and the working fluid may further expand upon further heating after vaporization. In some embodiments, the gas is superheated after vaporization to increase a pressure of the gas phase entering the turbine, generating a greater force on the turbine.

In some embodiments, the method further includes exhausting the heat from the working fluid to an ambient liquid with a sink heat exchanger. Exhausting the heat may include transferring the heat to seawater. In some examples, exhausting the heat includes transferring the heat to freshwater. In some embodiments, the temperature difference between the production temperature and the ambient temperature is no more than 121° C. In some embodiments, the production temperature and the ambient temperature define a temperature difference of at least 121° C. In some embodiments, the production temperature and the ambient temperature define a temperature difference of at least 100° C. In some embodiments, the production temperature and the ambient temperature define a temperature difference of at least 50° C. In some embodiments, the source heat exchanger and the sink heat exchanger define a temperature difference of at least 121° C. In some embodiments, the source heat exchanger and the sink heat exchanger define a temperature difference of at least 100° C. In some embodiments, the source heat exchanger and the sink heat exchanger define a temperature difference of at least 50° C.

In some embodiments, the method includes compressing the working fluid after the sink heat exchanger and before the source heat exchanger. In some examples, compressing the working fluid includes condensing the working fluid from a gas phase to a liquid phase. In some examples, compressing the working fluid includes decreasing a temperature of the working fluid in a gas phase.

In some examples, the thermal cycle generator may receive the production fluid through a bore within the thermal cycle generator and flow the production fluid through the thermal cycle generator between a first segment of production fluid pipe and a second segment of production fluid pipe coupled to the longitudinal ends of the thermal cycle generator (such as described herein). As described herein, the thermal cycle generator may be positioned around a portion of a production fluid pipe and receive heat from the production fluid through the segment of the production fluid pipe.

Systems, devices, and methods for the generation of electrical power in a subsea environment are described herein and at least according to the following clauses:

Clause 1. A method of producing electricity, the method comprising: receiving heat from a production fluid with a source heat exchanger; transferring the heat to a working fluid with the source heat exchanger; expanding the working fluid in a turbine; generating electricity with the turbine; exhausting heat from the working fluid to an ambient liquid with a sink heat exchanger; and compressing the working fluid after the sink heat exchanger and before the source heat exchanger.

Clause 2. The method of clause 1, wherein the method is performed in a subsea environment.

Clause 3. The method of clause 1 or 2, wherein the ambient fluid is seawater.

Clause 4. The method of any preceding clause, wherein a temperature difference between the production fluid and the ambient fluid is less than 121° C.

Clause 5. The method of any preceding clause, wherein the working fluid is ammonia.

Clause 6. The method of any preceding clause, wherein expanding the working fluid includes vaporizing at least a portion of the working fluid.

Clause 7. The method of any preceding clause, wherein compressing the working fluid includes condensing at least a portion of the working fluid.

Clause 8. The method of any preceding clause, wherein a mass flow of the working fluid is no more than 50 grams per second.

Clause 9. A system for producing electricity, the system comprising: a working fluid conduit configured to flow a working fluid therethrough; a source heat exchanger in thermal communication with the working fluid conduit and configured to transfer heat from a production fluid to the working fluid conduit; a sink heat exchanger in thermal communication with the working fluid conduit and configured to exhaust heat from the working fluid conduit to an ambient liquid; and a turbine in fluid communication with the working fluid conduit and configured to generate electricity from a flow of working fluid therethrough.

Clause 10. The system of clause 9, further comprising a production fluid pipe configured to flow production fluid therethrough and wherein the source heat exchanger is configured to contact a surface of the production fluid pipe.

Clause 11. The system of clause 9 or 10, wherein the source heat exchanger is configured to couple longitudinally between a first production fluid pipe and a second production fluid pipe and receive a flow of production fluid through a bore of the source heat exchanger.

Clause 12. The system of any of clauses 9-11, wherein the sink heat exchanger is corrosion resistant.

Clause 13. The system of clause 11, wherein the sink heat exchanger includes a corrosion resistant coating.

Clause 14. The system of clause 11, wherein the sink heat exchanger includes a corrosion resistant material.

Clause 15. The system of any of clauses 9-14, further comprising a subsea control device configured to receive electricity from the turbine.

Clause 16. The system of any of clauses 9-15, further comprising a battery configured to receive electricity from the turbine.

Clause 17. The system of any of clauses 9-16, further comprising a motor configured to receive electricity from the turbine.

Clause 18. The system of any of clauses 9-17, further comprising insulation positioned between the source heat exchanger and the sink heat exchanger.

Clause 19. The system of any of clauses 9-18, wherein the source heat exchanger has a contact surface configured to receive heat from the production fluid with a longitudinal length of between 1 meter and 5 meters.

Clause 20. A method of producing electricity, the method comprising: receiving heat from a production fluid with a source heat exchanger; transferring the heat to a working fluid with the source heat exchanger; vaporizing the working fluid to a gas phase; superheating the gas phase; flowing the gas phase through a turbine; generating electricity based on a rotation of the turbine; exhausting heat from the gas phase to a seawater with a sink heat exchanger; and condensing the gas phase to a liquid phase after the sink heat exchanger and before the source heat exchanger.

The embodiments of the modular electrical generators have been primarily described with reference to wellbore operations; the modular electrical generators described herein may be used in applications other than a wellbore or production operations. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements. Additionally, as used herein, the term "and/or" includes any and all combinations of one or more of the associated listed items.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of producing electricity, the method comprising:
   receiving heat from a production fluid with a source heat exchanger;
   transferring the heat to a working fluid with the source heat exchanger;
   expanding the working fluid in a turbine;
   generating electricity with the turbine;
   exhausting heat from the working fluid to an ambient liquid with a sink heat exchanger, wherein the sink heat exchanger is radially offset from the source heat exchanger, and insulation is positioned between the source heat exchanger and the sink heat exchanger; and
   compressing the working fluid after the sink heat exchanger and before the source heat exchanger.

2. The method of claim 1, wherein the method is performed in a subsea environment.

3. The method of claim 1, wherein the ambient liquid is seawater.

4. The method of claim 1, wherein a temperature difference between the production fluid and the ambient liquid is less than 121° C.

5. The method of claim 1, wherein the working fluid is ammonia.

6. The method of claim 1, wherein expanding the working fluid includes vaporizing at least a portion of the working fluid.

7. The method of claim 1, wherein compressing the working fluid includes condensing at least a portion of the working fluid.

8. The method of claim 1, wherein a mass flow of the working fluid is no more than 50 grams per second.

9. A system for producing electricity, the system comprising:
   a working fluid conduit configured to flow a working fluid therethrough;
   a source heat exchanger in thermal communication with the working fluid conduit and configured to transfer heat from a production fluid to the working fluid conduit;
   a sink heat exchanger in thermal communication with the working fluid conduit and configured to exhaust heat from the working fluid conduit to an ambient liquid;
   insulation positioned between the source heat exchanger and the sink heat exchanger; and
   a turbine in fluid communication with the working fluid conduit and configured to generate electricity from a flow of working fluid therethrough.

10. The system of claim 9, further comprising a production fluid pipe configured to flow production fluid therethrough and wherein the source heat exchanger is configured to contact a surface of the production fluid pipe.

11. The system of claim 9, wherein the source heat exchanger is configured to couple longitudinally between a first production fluid pipe and a second production fluid pipe and receive a flow of production fluid through a bore of the source heat exchanger.

12. The system of claim 11, wherein the sink heat exchanger includes a corrosion resistant coating.

13. The system of claim 11, wherein the sink heat exchanger includes a corrosion resistant material.

14. The system of claim 9, wherein the sink heat exchanger is corrosion resistant.

15. The system of claim 9, further comprising a subsea control device configured to receive electricity from the turbine.

16. The system of claim 9, further comprising a battery configured to receive electricity from the turbine.

17. The system of claim 9, further comprising a motor configured to receive electricity from the turbine.

18. The system of claim 9, wherein the source heat exchanger has a contact surface configured to receive heat from the production fluid with a longitudinal length of between 1 meter and 5 meters.

19. A system for producing electricity, the system comprising:
   a working fluid conduit configured to flow a working fluid therethrough;
   a source heat exchanger in thermal communication with the working fluid conduit and configured to transfer heat from a production fluid to the working fluid conduit;
   a sink heat exchanger in thermal communication with the working fluid conduit and configured to exhaust heat from the working fluid conduit to an ambient liquid;
   a turbine in fluid communication with the working fluid conduit and configured to generate electricity from a flow of working fluid therethrough; and
   a motor configured to receive the electricity from the turbine.

20. The system of claim 19, wherein the source heat exchanger is configured to couple longitudinally between a first production fluid pipe and a second production fluid pipe and receive a flow of production fluid through a bore of the source heat exchanger.

* * * * *